United States Patent [19]

Petrocelli et al.

[11] 4,002,824
[45] Jan. 11, 1977

[54] SELECTIVE ZOOM CAMERA AND DISPLAY

[75] Inventors: Edward A. Petrocelli, Sunrise, Fla.;
Anthony C. H. Louie, San Diego, Calif.

[73] Assignee: The United States of America as represented by the Secretary of the Navy, Washington, D.C.

[22] Filed: Jan. 28, 1976

[21] Appl. No.: 652,919

[52] U.S. Cl. .............................. 358/180; 358/213
[51] Int. Cl.² ........................................ H04N 7/00
[58] Field of Search ................. 178/6, 7.1, 7.5 SE

[56] References Cited

UNITED STATES PATENTS

| 3,491,200 | 1/1970 | Wisnieff | 178/7.5 SE |
| 3,705,328 | 12/1972 | Torok | 178/7.5 SE |
| 3,935,381 | 1/1976 | Petrocelli et al. | 178/7.1 |

FOREIGN PATENTS OR APPLICATIONS 678,034   8/1952   United Kingdom .......... 178/7.5 SE

*Primary Examiner*—Richard Murray
*Attorney, Agent, or Firm*—R. S. Sciascia; G. J. Rubens; T. M. Phillips

[57] ABSTRACT

A means is provided to display a picture with a portion magnified while the rest of the picture remains constant. The timing and clock rate applied to a solid state sensor (such as charge coupled devices or self-scanning photo-diode arrays) are adjusted so that the output of the sensor will provide a variable zoom video to be displayed by a standard TV monitor.

6 Claims, 11 Drawing Figures

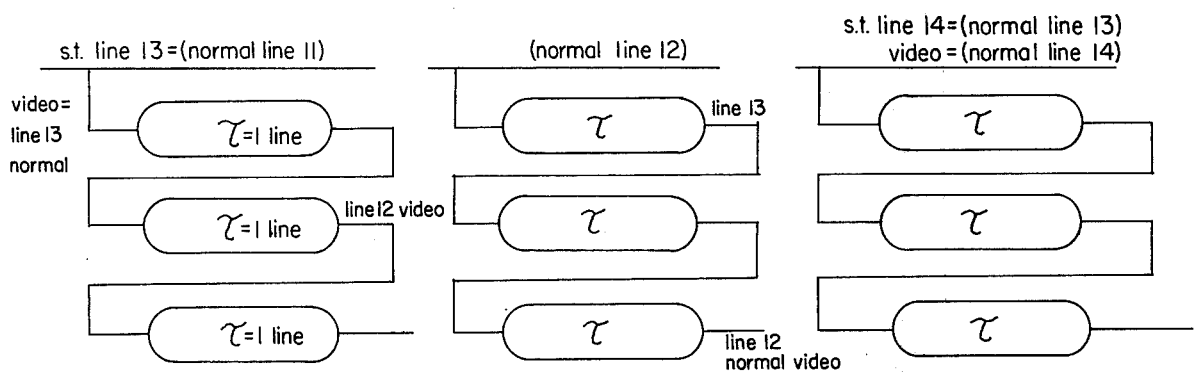
FIG. 10
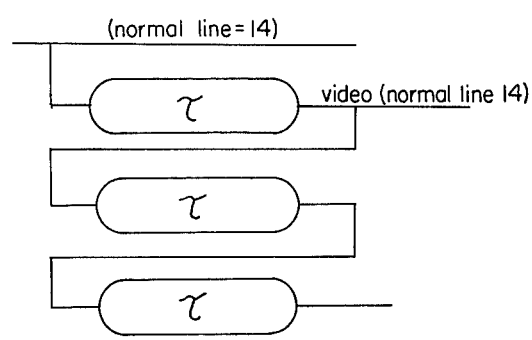
FIG. 11
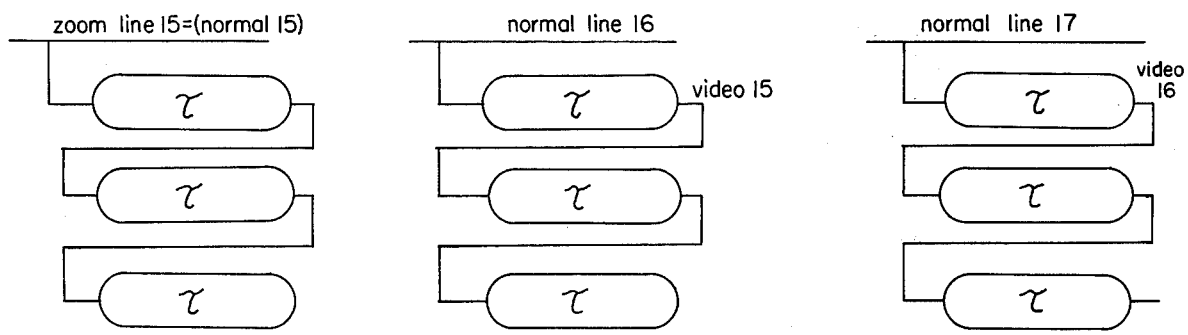
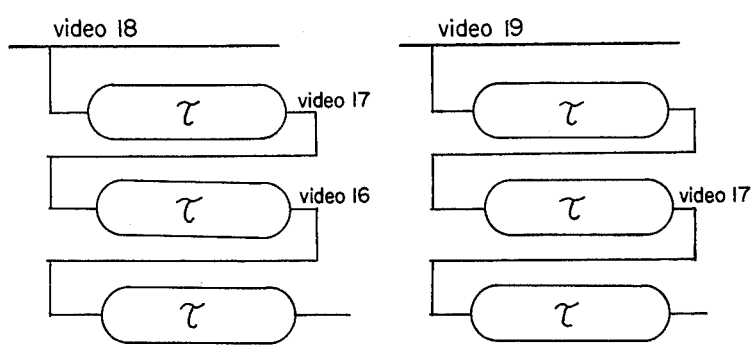

SELECTIVE ZOOM CAMERA AND DISPLAY

BACKGROUND OF THE INVENTION

There are several known systems for providing a combined television picture of a magnified subject and its normal surroundings. However, most of these systems use two separate cameras and a video mixer. One of the cameras requires the use of a zoom lens. The limitation lies in the number of equipments required and the complexity of the operation.

SUMMARY OF THE INVENTION

The present invention relates to TV cameras and more particularly to solid state sensors wherein variable scan generator means are used to produce the clock pulses to control the scanning. The resultant signal is controlled by the display generator so that the output display will be a combined magnified subject area and its normal surroundings in a single TV picture.

Accordingly an object of the invention is the provision of a TV camera with the capability of magnifying selected areas of interest in the television picture with the surrounding scene remaining unchanged.

Another object of the invention is the provision of a novel television camera employing solid state sensors such as charge coupled devices wherein a magnified subject area combined with the surrounding background can be shown on a single display.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 10 shows the sequential delay timing, and

FIG. 11 shows the sequential sampling timing.

DESCRIPTION OF THE PREFERRED EMBODIMENTS

Figure 1:
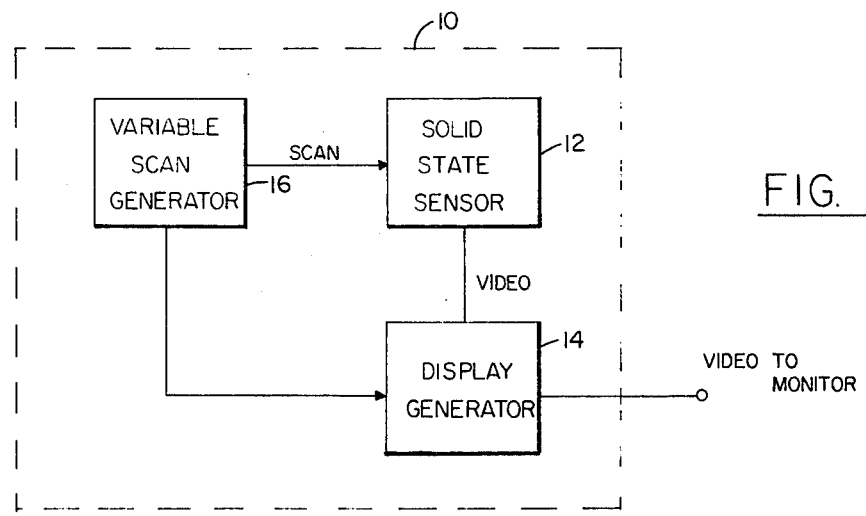
FIG. 1 is a generalized block diagram of the invention.
Figure 2:
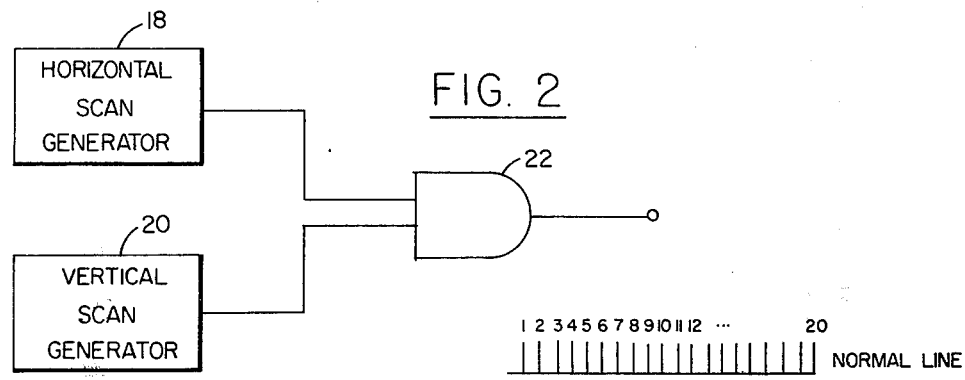
FIG. 2 is a generalized block diagram of the select zoom variable scan generator.

Referring now to FIG. 1 wherein there is shown in the generalized block diagram, a select zoom camera 10 that includes a solid state sensor 12 which may be of the charged coupled device type providing a video output to a display generator 14 when scanned by variable scan generator 16. Variable scan generator 16 produces the clock pulses to control the scanning of solid state sensor 12. The resultant video signal from sensor 12 is controlled by display generator 14 so that the output display will be a combined magnified subject area and its normal surroundings in a single TV picture.

The variable scan generator 16 of FIG. 1 consists of a horizontal scan generator 18 and a vertical scan generator 20. The outputs of these two generators are combined in an AND gate 22 to produce the variable scan for the solid state sensor of FIG. 1.

Figure 3:
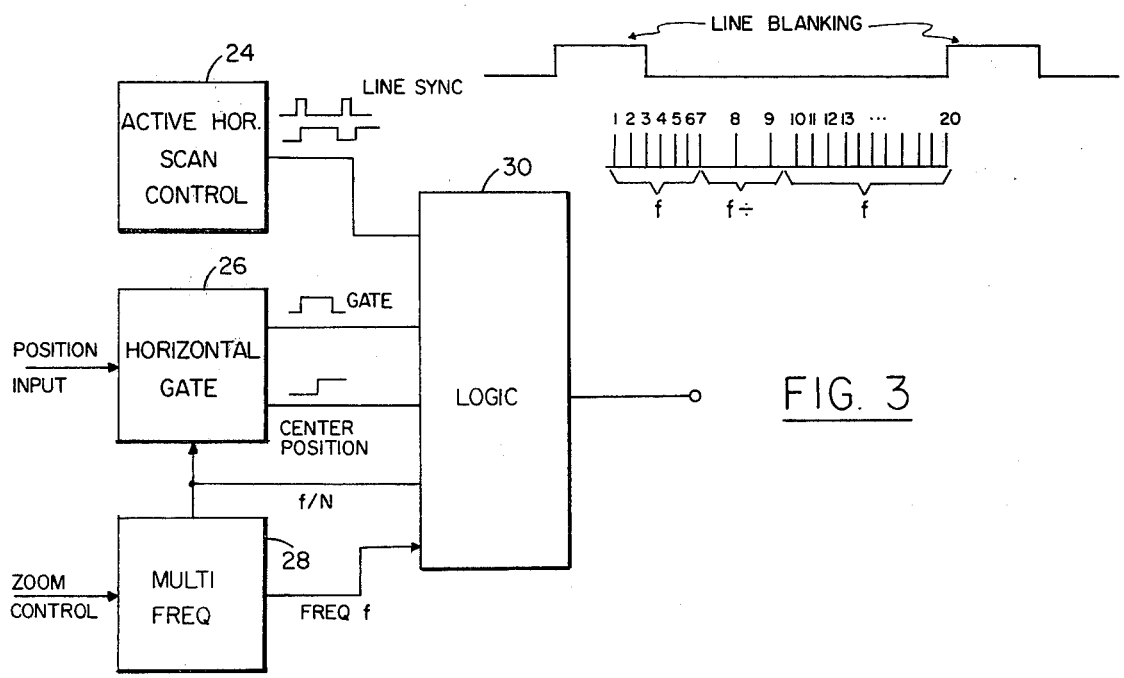
FIG. 3 is a more detailed block diagram of the select zoom horizontal scan generator.

As shown in FIG. 3 horizontal scan generator 18 comprises active horizontal scan control 24, horizontal gate 26, multi-frequency generator 28 and combatorial logic circuit 30.

Active horizontal scan generator 24 determines the time at which the clock pulses are allowed to start to scan the sensor 12. In the example waveforms shown, the active scan control allows the horizontal scan to start three resolution bit time earlier than the normal horizontal scan. Horizontal gate 26 determines the horizontal area where the subject image is to be magnified. In the example shown by the waveforms, for a 2:1 magnification, the horizontal scan rate during first half of this gate is at one-half of the normal scan rate. After the first half of the gate, normal scan rate is resumed. The examples of normal horizontal scan and variable scan pulses into waveforms shown are with respect to the line blanking signal.

Figure 4:
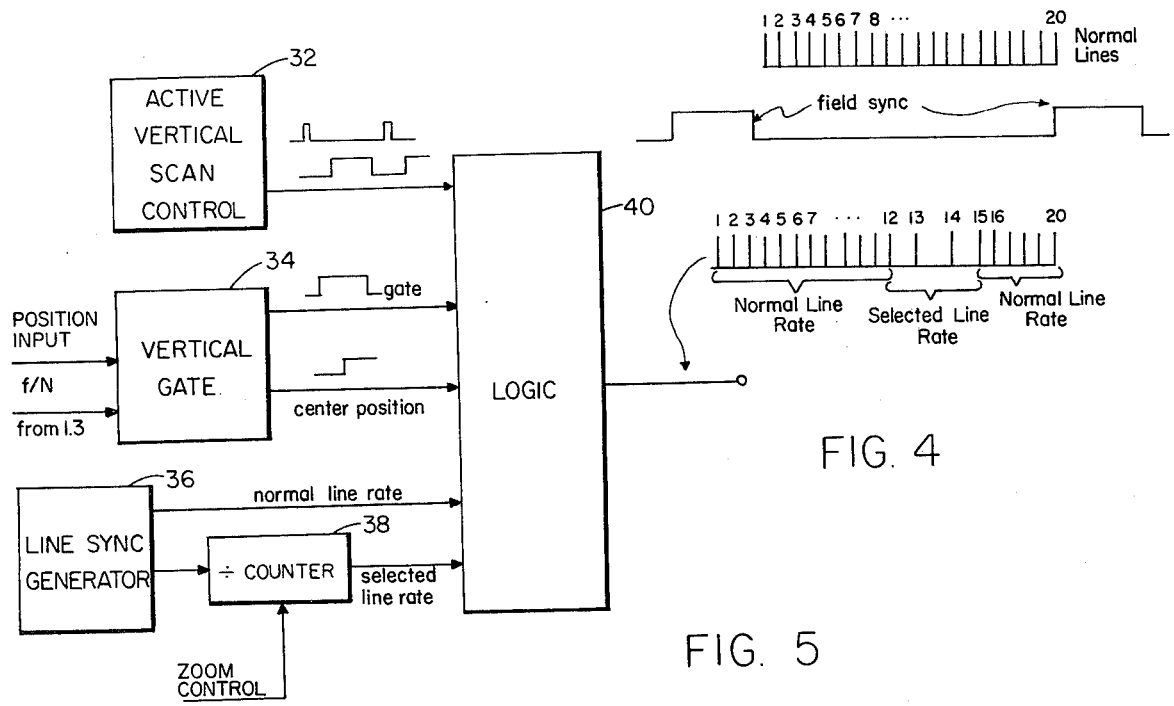
FIG. 4 is a detailed block diagram of the select zoom vertical scan generator.

FIG. 4 shows the vertical scan generator and comprises active vertical scan control 32, vertical scan control 34, line sync generator 36, divide by N counter 38 and combatorial logic circuit 40. Active vertical scan control 32 determines how far in advance the vertical scan is required to start. In the example waveforms shown the vertical scan control allows the vertical scan to start three lines earlier than the normal vertical scan. The vertical gate determines the vertical position in which the subject picture is to be magnified. During the first half of the gate the scan rate was one-half the normal scan rate for a 1:2 magnification. The scan rate will be one-third the normal scan rate for a 1:3 magnification. These different scan rates are supplied from the multi-scan gate generator comprised of the line sync generator 36 and divided by N counter 38. Counter 38 counts down from the normal scan rate. Combatorial logic circuit 40 selectively combines the normal and variable line rates to produce the vertical scan which is combined with the horizontal scan and thus the select zoom variable scan is generated.

Figure 5:
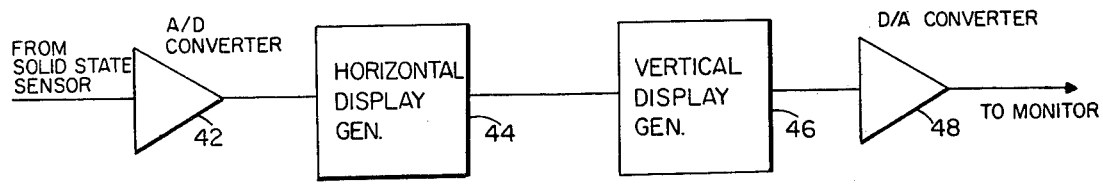
FIG. 5 is a generalized block diagram of the display generator.

FIG. 5 shows the display generator in block diagram form. The signal from the solid state sensor is fed to an analog to digital converter 42 for converting the analog video into digital video signal. The output of analog to digital converted 42 is fed to horizontal dispaly generator 44. The output from horizontal display generator 44 is fed to vertical dispaly generator 46 which provides both horizontally and vertically corrected video output that is fed to digital to analog converter 48.

Figure 6:
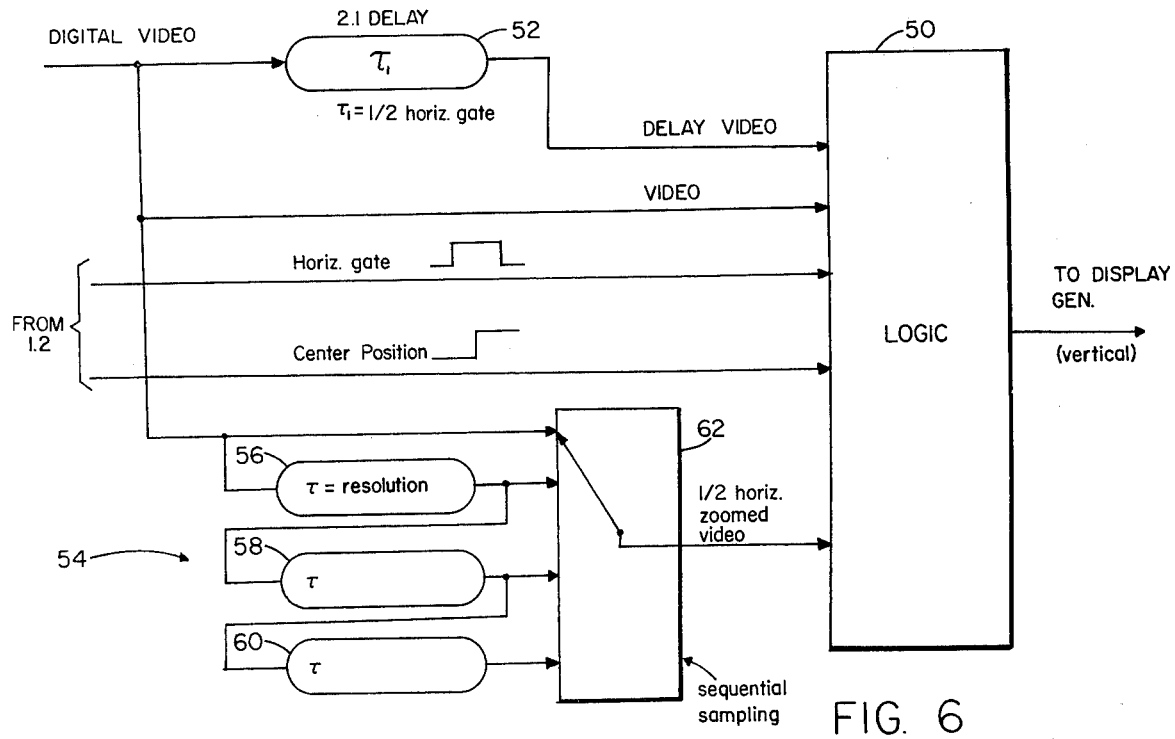
FIG. 6 is a detailed block diagram of the horizontal display generator.
Figure 7:
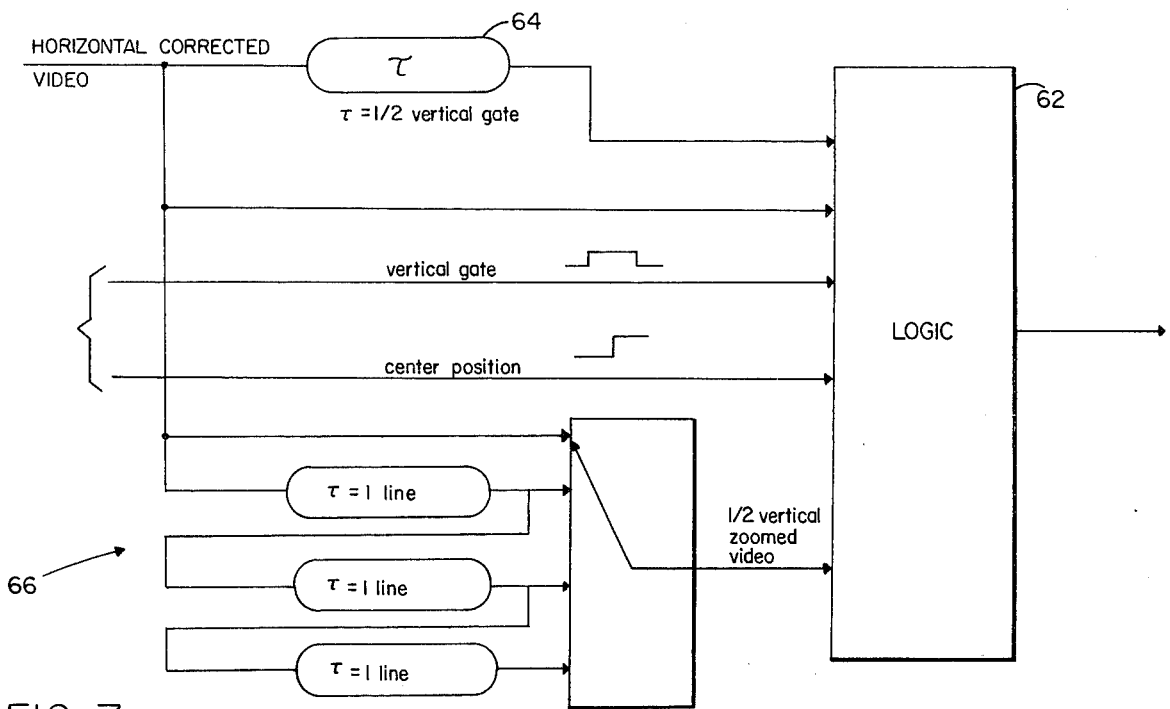
FIG. 7 is a detailed block diagram of the vertical display generator.

Referring now to FIG. 6 which shows the horizontal display generator in more detail, the digital video signals from analog to digital converter 42 are fed directly to combatorial logic circuit 50 and through a first delay circuit 52 and through a second delay circuit 54. Delay circuit 54 consists of three delay lines 56, 58 and 60. The output from delay circuit 54 goes from 0 delay to $3\tau$ delay means of a sequence sampling switch 62. The delay, $\tau$, in delay line 52 is one-half a horizontal gate width so that the number of lines in delay 54 equals one-half of the vertical gate width. The output from the horizontal corrected video out of logic circuit 50 is fed directly to logic circuit 62 (FIG. 7) and through horizontal delay circuits 64 and 66. Logic circuits 50 and 62 are controlled by the horizontal and vertical gates and center position signals respectively from vertical gate generator 34 (FIG. 4). Delay circuits 54 and 66 consist of a number of a plurality of delay elements which should equal one-half the vertical gate width. In the example shown there are three delay elements.

Figure 8:
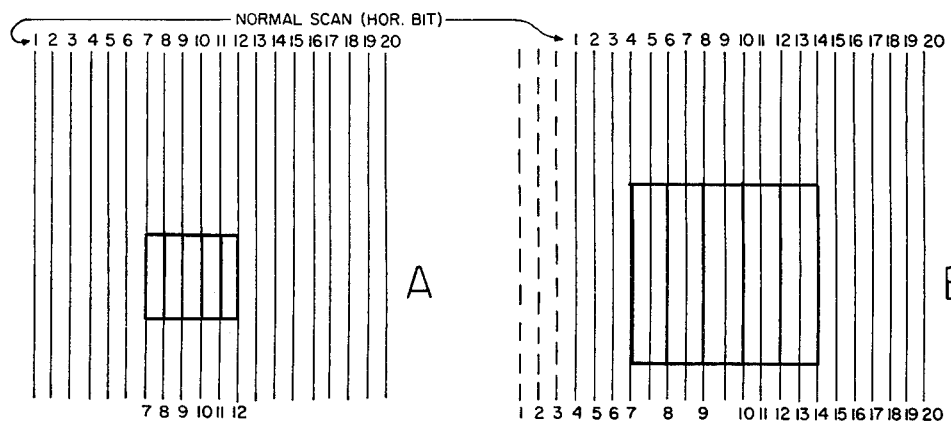
FIG. 8 is a graph depicting the horizontal select zoom concept.
Figure 9:
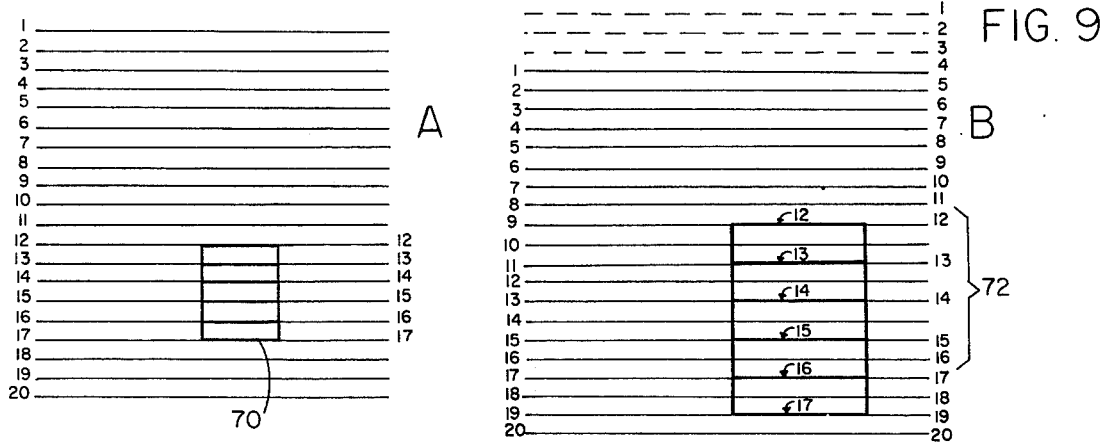
FIG. 9 is a graph depicting the vertical select zoom concept.

In order to understand the operation of the device, reference may be had to FIGS. 8 and 9 where there is illustrated a simplified example of A TV picture containing 20 TV lines. FIG. 8 shows the horizontal aspect of the TV picture while FIG. 9 shows the vertical aspect of the TV picture. Since the operation of the horizontal and vertical dimensions are similar, a description of FIG. 9 will suffice. FIG. 9A shows a normal twenty line TV picture with a subject area 70 selected in the lower right-hand quadrant. The vertical dimension of this gate in terms of TV lines is six TV lines. The center position of the gate lies between lines 14 and 15. In FIG. 9B the vertical scan is shown. Since one-half of the gate is three TV lines, the vertical scan is initiated three TV lines earlier than normal. When the scan comes within the gate (line 12) the variable scan assumes one-half of the line scan as indicated on lines 12, 13 and 14. After the center of the gate 72, the variable scan assumes the normal line rate starting from line 15 to line 20. Since the background video needs to remain unchanged outside the selected subject area, the video signal above the gate is delayed three TV lines. Thus, as far as video signal is concerned, it occurs at the same time as the normal TV video. The right hand side of FIG. 9B shows the select zoom line scan number, and the left hand side the normal line scan number. Normal line 8 is three TV lines behind select zoom line scan line 8. After normal line 12, normal line 13 is two lines delayed with respect to the select zoom line 13. Normal line 14 is the one line delayed with respect to zoom line 14. This sequential delay timing is shown in FIG. 11. After the center of the vertical gate the select zoom scan assumes normal scan and rate and therefore the select zoom line scan number is identical to the normal line scan number from line 15 to line 20. In the background area the video displayed is as generated from the sensor. However, the video signal within the select gate is sequentially delayed with respect to the normal lines. The video signal within the gate at line 15 is the same as normal line 15. The zoom video line 16 is delayed one line with respect to the normal TV line. The zoom video line 17 is two lines delayed with respect to the normal video line 17. The sequential delay timing is shown in FIG. 11.

Obviously many modifications and variations of the present invention are possible in the light of the above teachings. It is therefore to be understood that within the scope of the appended claims the invention may be practiced otherwise than as specifically described.

What is claimed is:

1. An electronic control system for selectively controlling the scanning rate of a solid state sensor to display a picture with a portion being magnified while the remainder remains constant comprising:
    a. solid state sensor means for providing video output signals in response to being electronically scanned,
    b. variable scan generator means coupled to said solid state sensor for providing selectively controlled clock signals to drive said solid state sensor,
    c. display generator circuit means coupled to said solid state sensor and to said variable scan generator means for providing an output video signal that when displayed will display a picture with a portion being magnified while the remainder remains constant.

2. The control system of claim 1 wherein said variable scan generator means includes a horizontal scan generator for providing horizontal scan clock signals for scanning said solid state sensor at two different rates.

3. The system of claim 2 wherein said horizontal scan generator includes means for changing the frequency of a portion of the horizontal scan clock signals.

4. The control signal of claim 1 wherein said variable scan generator means includes a vertical scan generator for providing vertical scan clock signals for scanning said solid state sensor at the two different rates.

5. The system of claim 4 wherein said vertical scan generator includes means for changing the frequency of a portion of the vertical scan signals.

6. The system of claim 1 wherein said display generator circuit means includes sequential delay circuit means for sequentially delaying the video from said sensor in increasing increments of delay.

* * * * *